No. 659,509. Patented Oct. 9, 1900.
J. L. CONNABLE.
RUBBER TIRE.
(Application filed May 9, 1900.)
(No Model.)

Witnesses
Jas. H. Blackwood
Albert B. Blackwood.

Inventor
John L. Connable
By W. H. Doolittle & Son
Attorneys.

UNITED STATES PATENT OFFICE.

JOHN L. CONNABLE, OF CHATTANOOGA, TENNESSEE.

RUBBER TIRE.

SPECIFICATION forming part of Letters Patent No. 659,509, dated October 9, 1900.

Application filed May 9, 1900. Serial No. 16,058. (No model.)

*To all whom it may concern:*

Be it known that I, JOHN L. CONNABLE, a citizen of the United States, residing at Chattanooga, in the county of Hamilton and State of Tennessee, have invented certain new and useful Improvements in Rubber Tires; and I do hereby declare the following to be a full, clear, and exact description of the invention, such as will enable others skilled in the art to which it appertains to make and use the same.

My invention relates to rubber tires for vehicles; and it consists of an improvement in that class of tires which are provided with a retaining wire or wires passing through a passage or passages in the tire for holding the same to the wheel rim or felly. It has been found in practice that rubber under constant pressure for a great length of time loses its life and elasticity, and with such tires the heavy pressure put upon the wire will in time cause the wire to cut the channel through which it passes and eventually destroy the tire.

The object of my improvement is the adoption of an immovable bearing for the wire which will hold the same permanently in place, prevent the creeping or displacement of the wire, and at the same time relieve the wire from all strain and pressure on the rubber.

To this end my invention consists of the combination, with a rubber tire having longitudinal channels and retaining-wires therein, of bearing-plates embedded in the tire, each of said plates provided with a flat surface-body and at diagonally-opposite corners with a projection having a semicircular notch in which a wire is adapted to rest and by which it is held in place, said plates arranged in series in the tire and at intervals apart, whereby the wires are held rigidly parallel and immovable and each wire aiding to cushion the other and keep the plate from tilting.

My invention also consists in the form and construction of such bearing-plate in itself, all as more fully hereinafter described and particularly claimed.

My invention is illustrated in the accompanying drawings, in which—

Figure 1:
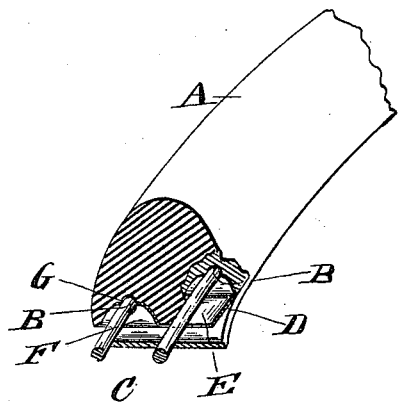
Figure 2:
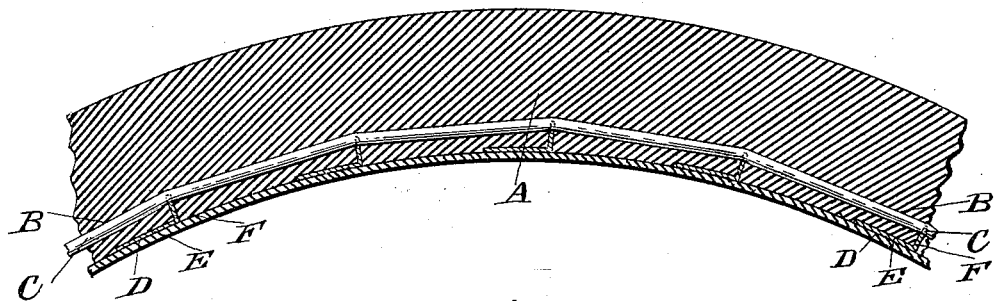
Figure 3:
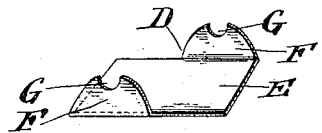
Figure 4:
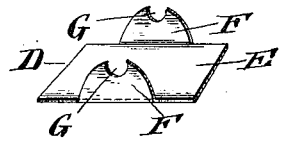

Figure 1 is a perspective view, partly in section, showing the outlines of a rubber tire and two wire strands with their respective bearings properly located; Fig. 2, a central longitudinal section; Fig. 3, a detail perspective of one of the bearing-plates, and Fig. 4 a modification of the same.

Referring to the drawings, the rubber tire A, which may be of any desirable form, is shown provided with two continuous channels or passages B for the reception of retaining-wires C.

D shows retaining and bearing plates, which constitute the essential feature of this invention. These plates, made of any suitable material, but preferably of metal, comprise a flat body portion or base E, which is provided at diagonally-opposite corners with a lug, ear, or bridge F, projecting up at right angles to the base and having a semicircular notch G, which constitutes the upper edge of the bridge F. The plates D are firmly embedded in the rubber tire A and are located therein at intervals—say two inches apart—around the entire circumference of the tire. They are so arranged that each retaining-wire C rests in and bears on the semicircular notch G, and in practice when the wires are drawn tightly over the notches that portion of each wire between two bearings will be in almost a straight line, and there will be a bend of the wire at each notched portion of the bearing. These bends in the wire are clearly shown at H, and they are caused by the wire being tightly drawn over the sharp edge of the bridge F, and it will be readily seen that they prevent any creeping or longitudinal movement of the wires within the passages B. Owing to the location of the lugs or ears on the body portion E of the retaining-plates D, as above described, and further to the fact that these plates are embedded in the rubber tire it is impossible to move or displace the plates by any concussion on the tread of the tire or other pressure from the top or bottom or against the sides thereof.

The wires are held against lateral movement by the sides of the notch, and by the diagonal arrangement of the corner-supports the wires, as before stated, are held rigidly parallel and by their conjoint pressure on the plate hold both themselves and the plate in position and prevent their being strained apart.

My invention is peculiarly and particularly useful when two fastening-wires are used, as it obviates the necessity of employing two separate sets of holding devices for each tire, while it performs the additional function of holding both wires in position by one device. The elevation of the bearings from the plate should be in proportion to the size of the tire used and the depth of the channel-tire of the wheel. The edges of the plates are to be rounded and smoothed, so they will not cut the rubber, and so embedded that sufficient rubber will be under them and at their edges as to effectually prevent them from cutting through, admitting moisture, or weakening the tire. When a tire is equipped with these bearings, it can be put in the channel-tire in the usual way.

My invention is not restricted to the shape of the passages, nor to the shape or form of the wires put through such passages, nor to the manner of securing the retaining-plates to the tire. It is apparent that my retaining-plate may be used with a single fastening-wire and a single passage for the same, as illustrated in the modification shown in Fig. 5, in which the projection having the semicircular notch is turned up from the central portion of the body of the plate. It will be noticed that in both forms of my device the retaining-plate has not a broad smooth bearing-surface for the wire, but that the wire is bent by pressure over the comparatively thin sharp edge of an upturned bridge.

Having thus described my invention, what I claim is—

1. A rubber tire provided with retaining-wires and passages for said wires, in combination with a bearing-plate for the wires, said plate provided with holding means at diagonally-opposite corners of said plate, substantially as described.

2. A holding-plate for the retaining-wires of a rubber tire consisting of a flat metal body having upturned projections at its diagonally-opposite corners and semicircular recesses within said projections in which the wires rest and by which they are held, substantially as described.

3. A holding-plate for the retaining-wire of a rubber tire consisting of a flat piece of metal provided with a bridge turned up from the body of the plate, said bridge having a semicircular open notch with a thin sharp edge, over which the wire is adapted to be bent, stretched and held from endwise movement, substantially as described.

4. A rubber tire bearing-plate provided with a flat surface body portion or base, a bridge turned up from said base, said bridge provided with an open semicircular notch G having a comparatively thin sharp upper edge over which the wire is bent by pressure, and the edges of the base of said plate smooth and rounded and the rubber of the tire extended under said base and around the said base edges, substantially as described.

5. In a rubber tire for vehicle-wheels having longitudinal channels and retaining-wires therein, the combination therewith of a series of bearing-plates, embedded at intervals in the tire, each plate having open recessed lugs at diagonally-opposite corners adapted to receive, bend and support said retaining-wires, substantially as described.

In testimony whereof I affix my signature in presence of two witnesses.

JOHN L. CONNABLE.

Witnesses:
E. H. ROLSTON,
C. L. FROST.